United States Patent [19]

Shichida et al.

[11] 3,904,900

[45] Sept. 9, 1975

[54] PULSE OPERATED TWO-AXIS LINEAR MOTOR

[75] Inventors: Hiromichi Shichida; Kenichi Toyoda, both of Hino, Japan

[73] Assignee: Fujitsu Fanuc Limited, Tokyo, Japan

[22] Filed: Aug. 27, 1974

[21] Appl. No.: 500,938

[30] Foreign Application Priority Data

Aug. 31, 1973 Japan............................ 48-98009

[52] U.S. Cl. .................... 310/12; 310/13; 318/38; 318/135
[51] Int. Cl. ............................................. H02k 41/02
[58] Field of Search ............................ 318/35–38, 318/115, 135, 687; 310/12–14; 396/29

[56] References Cited
UNITED STATES PATENTS

| | | | |
|---|---|---|---|
| 3,268,747 | 8/1966 | Snowdon | 310/13 |
| 3,832,610 | 8/1974 | Shimizu et al. | 318/38 X |
| 3,851,196 | 11/1974 | Hinds | 310/12 |
| 3,857,075 | 12/1974 | Sawyer | 318/38 |
| 3,857,078 | 12/1974 | Sawyer | 318/138 X |

*Primary Examiner*—Donovan F. Duggan
*Attorney, Agent, or Firm*—Staas & Halsey

[57] ABSTRACT

A device is disclosed for transferring an object on a horizontal plane in a first direction, in a second direction which crosses the first direction or in any direction between the first and second direction by making use of a pulse operated linear motor comprised of a plurality of pairs of electromagnetic energizing elements, that is electromagnets, wherein one electromagnetic energizing element of each of said pairs of electromagnetic energizing elements is arranged symmetrically via a predetermined central point with respect to the other electromagnetic energizing element of the pair of electromagnetic energizing elements.

4 Claims, 15 Drawing Figures

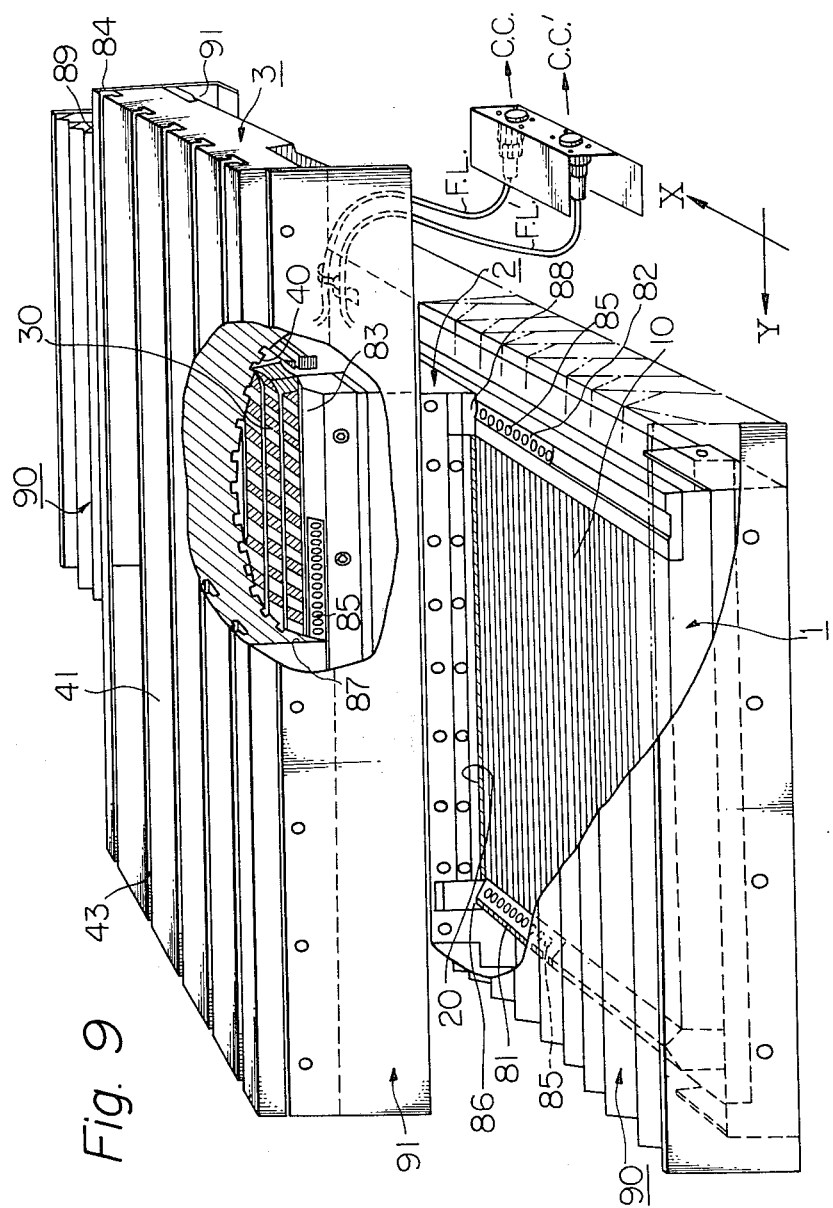

Fig. 10-A
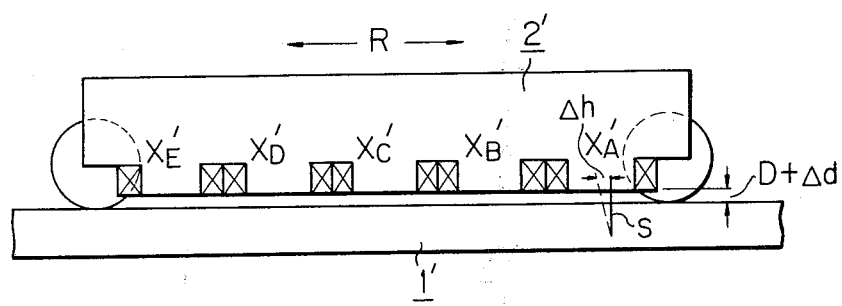
Fig. 10-B
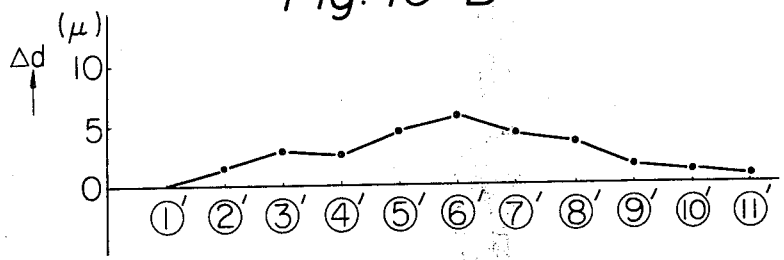
Fig. 10-C
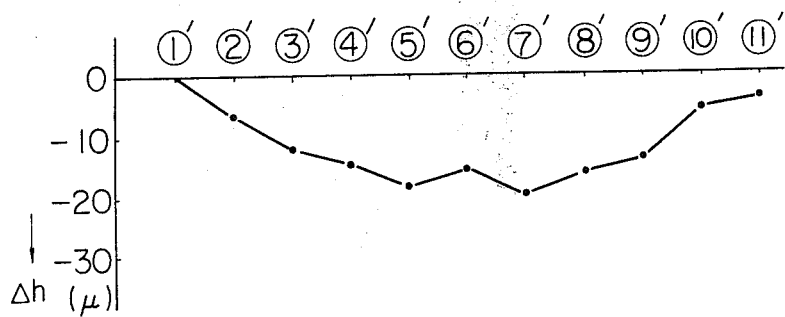

Fig. 11-A
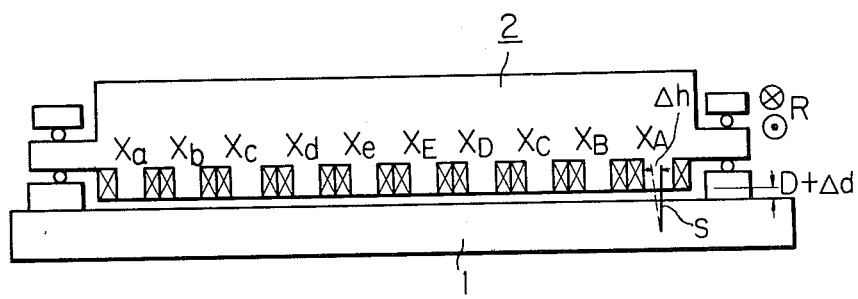
Fig. 11-B
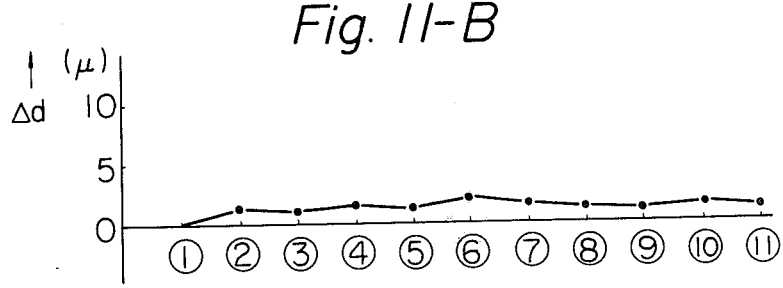
Fig. 11-C
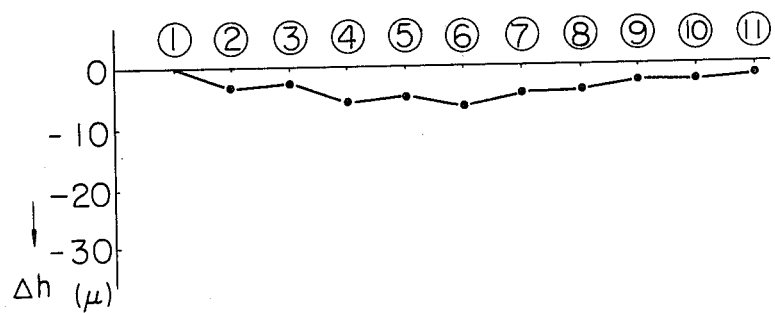

PULSE OPERATED TWO-AXIS LINEAR MOTOR

DISCLOSURE OF THE INVENTION

The present invention relates, in general, to a two-axis magnetic positioning device by which an object can be transferred in a first direction, a second direction which is not parallel to the first direction, or in any direction between the first and second directions on a horizontal plane and, more particularly, relates to a two-axis magnetic positioning device which is comprised of two conventional pulse operated linear motors. Each of the two conventional pulse operated linear motors has a plate-like slider and a plate-like stator, and further one of the two pulse operated linear motors is arranged so as to move in a first direction and the other of the two pulse operated linear motors is arranged so as to move in a second direction perpendicular to said first direction. A first pulse operated linear motor of said two pulse operated linear motors can transfer a second pulse operated linear motor of said two pulse operated linear motors with constant fine steps only in the first direction, and the second pulse operated linear motor can transfer an object placed thereon with constant fine steps only in the second direction. Thus the object can be transferred to any desired position on a horizontal plane on which the object is required to move by driving either the first or second pulse operated linear motors, or both simultaneously, according to a predetermined driving sequence.

Various types of two-axis magnetic positioning devices have been proposed in which the above described two-axis magnetic positioning device belongs to a type which is basically comprised of a so-called pulse operated two-axis linear motor. The present invention concerns the improvement of the pulse operated two-axis linear motor of the prior art which has recently been proposed by this applicant. The pulse operated two-axis linear motor of the prior art is comprised of a first member having a first surface; a second member having a second surface and a third surface, which can move in a first direction with respect to the first member keeping a small air gap between said first surface and said second surface and; a third member having a fourth surface, which can move in a second direction with respect to the second member keeping a small air gap between said third surface and said fourth surface.

The above-mentioned first surface is comprised of a plurality of first teeth made of a magnetic material which are arranged in the first direction with a constant pitch "P," and each first tooth extends in the second direction. The second surface comprises a plurality of first electromagnetic energizing means which drive the second member in the first direction with respect to the first member by electromagnetically cooperating with said first teeth wherein each first electromagnetic energizing means has a plurality of first driving teeth which are surrounded by exciting coils. The fourth surface is comprised of a plurality of second teeth made of a magnetic material which are arranged in the second direction with a constant pitch "P," and each second tooth extends in the first direction. The third surface comprises a plurality of second electromagnetic energizing means which drive the third member in the second direction with respect to the second member by electromagnetically cooperating with said second teeth wherein each second electromagnetical energizing means has a plurality of second driving teeth which are surrounded by exciting coils.

However, the above described recently proposed pulse operated two-axis linear motor has the following defects. When the exciting coils surrounding selected first driving teeth are energized by command pulses applied from control circuits, a strong attractive force occurs between the first driving teeth of the second member and the corresponding first teeth of the first member. During operation the strong attractive force occurs reciprocally in succession between selected first driving teeth and the corresponding first teeth and then between other selected first driving teeth which are located adjacent to said selected adjacent first driving teeth and corresponding adjacent first teeth, along the first direction at high speed. Thus high speed movement of the attractive force is produced. Similarly, when the exciting coils surrounding selected second driving teeth are energized by command pulses applied from the control circuits, a strong attractive force occurs between the second driving teeth of the second member and the corresponding second teeth of the third member on which the work to be processed is fixed. During operation the above-mentioned high speed movement of the attractive force is also produced between the second member and the third member. This movement occurs along the second direction in fine steps.

The above-mentioned movement of the attractive force provides deleterious effects on the pulse operated two-axis linear motor, that is, firstly creation of undesirable vibration when the frequency at which the movement occurs coincides with the natural oscillation of the pulse operated two-axis linear motor and, secondly, difficulty in manufacturing a piece of work with high accuracy in accordance with a design which has to be applied to the piece of work.

It is a principal object of the present invention to provide a pulse operated two-axis linear motor which provides no undesirable vibration and enables the manufacture of a piece of work with high accuracy in accordance with a desired design. Specifically, it is an object of the present invention to provide arrangements of the first driving teeth and the second driving teeth which are accompanied by no movements of the positions to which attractive forces are applied.

The present invention will be more apparent from the ensuing description with reference to the accompanying drawings wherein:

FIG. 9 is a perspective view of a pulse operated two-axis linear motor according to the present invention, utilized in a manufacturing system;

FIG. 10-A is a schematic view of the first member 1' and the second member 2' of the prior art which were used for tests to obtain the graphs shown in FIGS. 10-B and 10-C;

FIGS. 10-B and 10-C are graphs showing the performances observed using the tested members shown in FIG. 10-A;

FIG. 11-A is a schematic view of the first member 1 and the second member 2 of the present invention which were used for tests to obtain the graphs shown in FIGS. 11-B and 11-C, and;

FIGS. 11-B and 11-C are graphs showing the performances observed using the tested member shown in FIG. 11-A.

Figure 1:
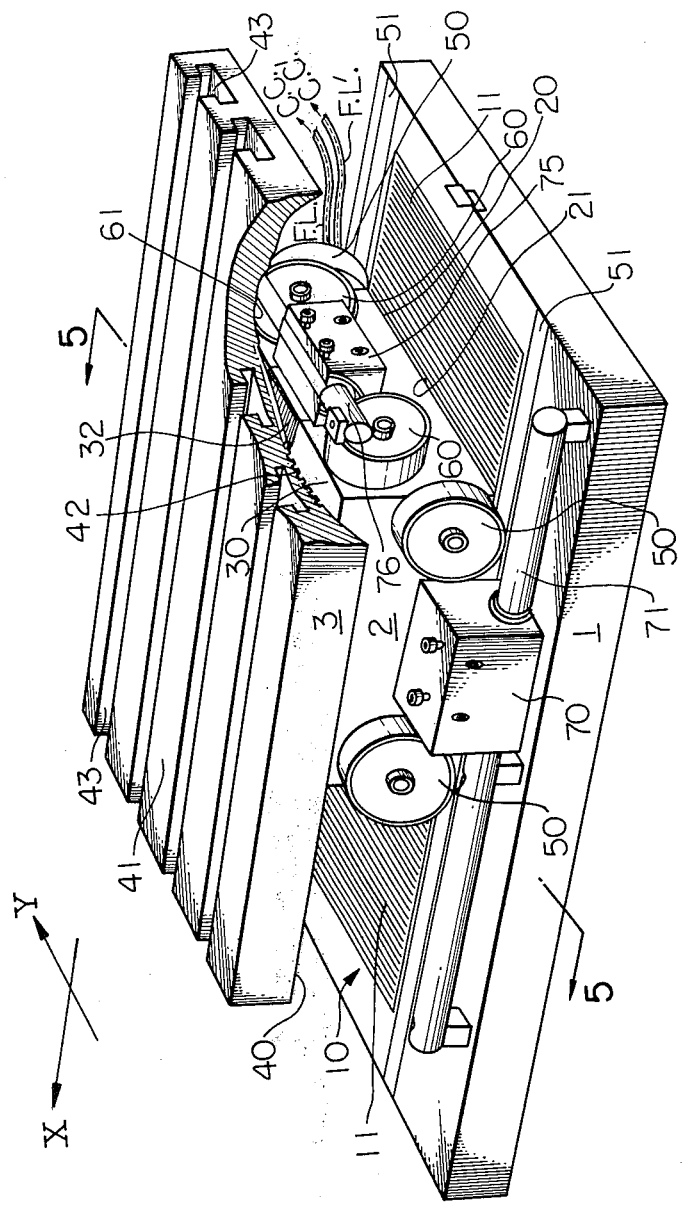
FIG. 1 is a perspective view, partially cut off, showing an embodiment of the pulse operated two-axis linear motor according to the present invention.
Figure 2:
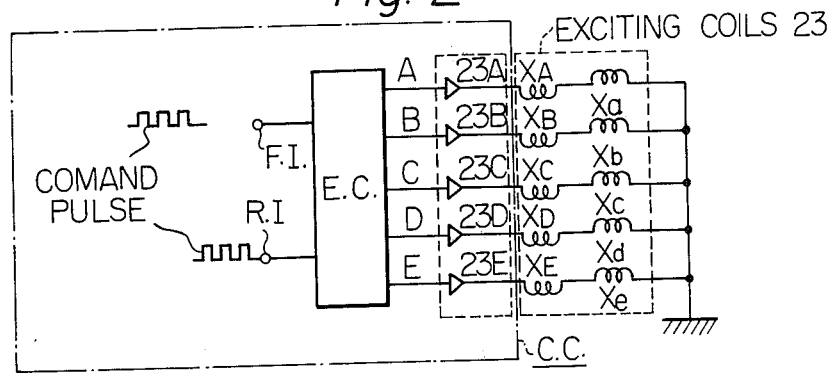
FIG. 2 is a block diagram of the control circuit according to the present invention.

FIG. 1 is a perspective view, partially cut off, showing an embodiment of the pulse operated two-axis linear motor of the present invention. In this Fig., the reference numeral 1 indicates a first member. The first member 1 has a plurality of first teeth on a first surface 10. The first teeth 11, acting as a scale which defines the length of a step, are arranged in a first direction, that is along the X-axis, at a predetermined constant pitch "P," and each first tooth 11 extends in a second direction, that is along the Y-axis perpendicular to the X-axis. The reference numeral 2 indicates a second member which is located above the first surface 10, that is, above the top surfaces of the first teeth 11, and the second member 2 is able to move by means of roller 50 in the first direction (X). The second member 2 has first driving teeth 21 (not shown in FIG. 1) on its bottom surface and second driving teeth 32 on its top surface. The roller 50 which rotates on a rail 51, located on the first surface 10 of the first member 1, together with the second member 2, maintains a constant small air gap between said first teeth 11 and the first driving teeth 21 (not shown in FIG. 1), that is, the bottom surface of the second member 2. A plurality of first electromagnetic energizing means, each of which is comprised the first driving teeth 21 and exciting coils 23 (not shown in FIG. 1), are arranged E.C. second surface 20. The first electromagnetic energizing means cooperate electromagnetically with the first teeth 11, and move the second member 2 in the first direction (X) with constant fine steps according to power amplified command pulses from a control circuit C. C. through feed line F.L. The electrical connection between the control circuit C.C. and the exciting coils 23 is shown in FIG. 2. The exciting coils 23 of the first electromagnetic energizing means energize corresponding first driving teeth 21 according to the control of the control circuit C.C. The first electromagnetic energizing means are respectively symbolized in FIG. 2 by $(X_A, X_a)$, $(X_B, X_b)$, $(X_C, X_c)$, $(X_D, X_d)$ and $(X_E, X_e)$.

Referring to FIG. 2 command pulses are applied to an exciting controller E.C. through a forward input terminal F.I. The exciting controller E.C. decides the energization order (A, B, C, D and E) of the exciting coils 23 and outputs from the exciting controller E. C. excite the selected exciting coils through amplifiers 23A, 23B . . . , 23E in accordance with said energization order. When a reversed energization order is required, the command pulses are applied to the reverse input terminal R.I.

Referring again to FIG. 1, a third member 3 has a plurality of second teeth 42 on a fourth surface 40. The second teeth 42, acting as a scale which defines the length of a step, are arranged in the second direction (Y) at a predetermined pitch "P," and each second tooth 42 extends in the first direction (X). The third member 3 is located above a third surface 30 of the second member 2, that is, above the top surfaces of the second driving teeth 32. The third member 3 is able to move by means of a roller 60 in the second direction along the Y-axis. A rail 61 (not shown in FIG. 1) is located on a fourth surface 40, that is the bottom surface of the third member 3 and rides on the roller 60. The roller 60 maintains a constant small air gap between the second driving teeth 32 and, the second teeth 42. The third member 3 acts as, for example, a machining table which firmly holds a workpiece to be processed on its top surface 41 by way of T-shaped fixing grooves 43. The second electromagnetic energizing means, each of which is comprised of the second driving teeth 32 and exciting coils 33 (not shown in FIG. 1), are arranged on the third surface 30 of the second member 2. The second electromagnetic energizing means cooperate electromagnetically with the second teeth 32, and move the third member 3 in the second direction (Y) with constant fine steps according to the power amplified command pulses from another control circuit C.C'. through a feed line F.L'. The connection between the control circuit C.C.'. and the exciting coils 33 is the same as in the block diagram shown in FIG. 2 for the exciting coils 23 and C.C. However, the reference numbers or symbols 23A, 23B–23E indicating amplifiers, 23 indicating exciting coils, and $(X_A, X_a)$, $(X_B, X_b)$, $(X_C, X_c)$, $(X_D, X_d)$ and $(X_E, X_e)$ symbolizing the first electromagnetic energizing means must be respectively replaced by 33A – 33E, 33, and $(Y_A, Y_a)$, $(Y_B, Y_b)$, $(Y_C, Y_c)$ and $(Y_D, Y_d)$ and $(Y_E, Y_e)$ which symbolize the second electromagnetic energizing means.

In the embodiment shown in FIG. 1, the second member 2 is restricted to move only in the first direction (X) during operation by means of a ball bush 70 which is fixed to one side of the second member 2. The ball bush 70 is slidably connected to the guide shaft 71 which is fixed to the first surface 10 and extends in the first direction (X). Similarly the third member 3 is restricted to move only in the second direction (Y) during operation by means of a ball bush 75 which is fixed to another side of the second member 2. The ball bush 75 is slidably connected to the guide shaft 76 which is fixed to the fourth surface 40, that is, the bottom surface of the third member 3.

The arrangement of the first electromagnetic energizing means and also of the second electromagnetic energizing means will now be explained. However, since the arrangement of the first electromagnetic energizing means is basically the same as that of the second electromagnetic energizing means, only the arrangement of the first electromagnetic energizing means is explained hereinafter.

Figure 3:
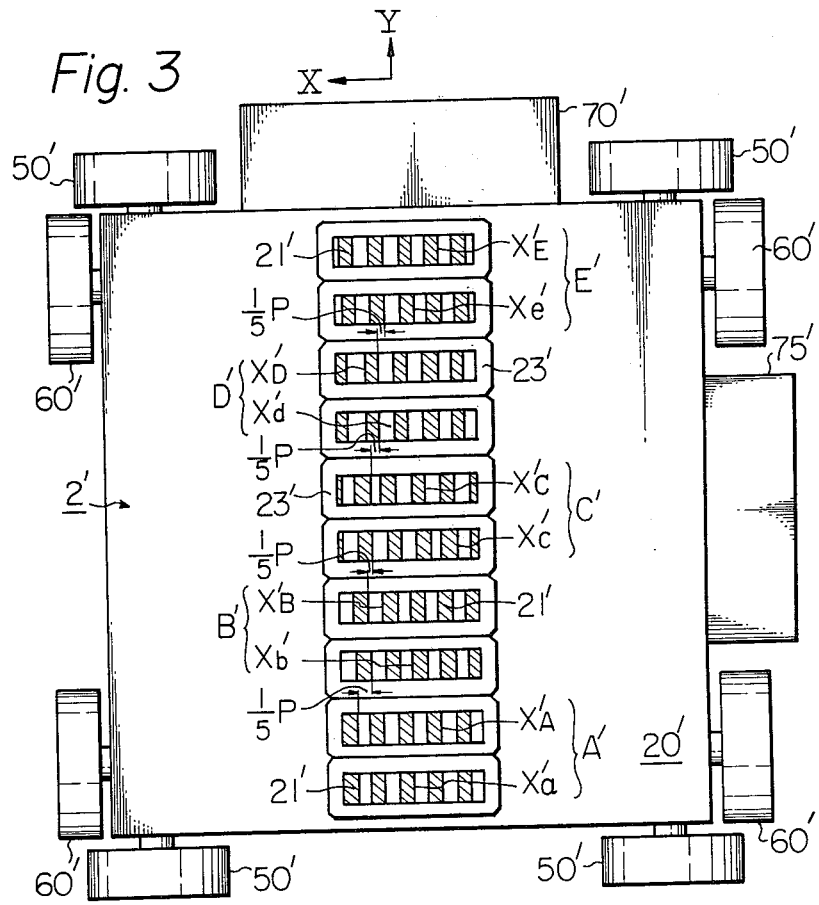
FIG. 3 shows the arrangement of a first electromagnetic energizing means of a prior art.

FIG. 3 shows the arrangement of first electromagnetic energizing means $(X_A', X_a')$, $(X_B', X_b')$–$(X_E', X_e')$ of a prior art in the case where the pulse operated linear motor is comprised of 5 phase alternately excited linear motor. It should be noted that FIG. 3 is a plan view showing the bottom of a prior art second member 2'. In FIG. 3, the first electromagnetic energizing means is comprised of five pairs of first electromagnetic energizing elements indicated as $(X_A', X_a')$, $(X_B', X_b')$, $(X_C', X_c')$, $(X_D', X_d')$ and $(X_E', X_e')$, respectively. Each of the first electromagnetic energizing elements $X_A'$, $X_B'$, $X_C'$, $X_D'$ and $X_E'$ acts as a north pole piece when the corresponding exciting coils 23' are energized. Each of the first electromagnetic energizing elements $X_a'$, $X_b'$, $X_c'$, $X_d'$ and $X_e'$ acts as a south pole piece when the corresponding exciting coils 23' are energized. Both the first electromagnetic energizing element $X_A'$ acting as north pole piece and the first electromagnetic energizing element $X_a'$ acting as south pole piece form one electromagnet. This arrangement is the same with regard to the other first electromagnetic energizing means $(X_B', X_b')$, $(X_C', X_c')$, $(X_D', X_d')$ and $(X_E', X_e')$.

The defect of the prior art, previously mentioned, is produced because of the arrangement of the first electromagnetic energizing means shown in FIG. 3. When the first electromagnetic energizing means are excited by the following 2 phase – 3 phase alternate excitation sequence, $\{(X_A', X_a'), (X_B', X_b')\} \rightarrow \{(X_A', X_a'), (X_B', X_b'), (X_C', X_c')\} \rightarrow \{(X_B', X_b'), (X_C', X_c')\} \rightarrow \{(X_B', X_b'), (X_C', X_c'), (X_D', X_d')\} \rightarrow \{(X_C', X_c'), (X_D', X_d')\} \rightarrow \{(X_C', X_c'), (X_D', X_d'), (X_E', X_e')\} \rightarrow \{(X_D', X_d'), (X_E', X_e')\} \rightarrow \{(X_D', X_d'), (X_E', X_{e'}), (X_A', X_a')\} \rightarrow \{(X_E', X_e'), (X_A', X_a')\} \rightarrow \{(X_E', X_{e'}), (X_A', X_a'), (X_B', X_b')\}$. The attractive force between the first electromagnetic energizing means and the first teeth moves reciprocatively according to the above mentioned sequency along the Y-axis The movement of the strong attractive force firstly creates undesirable vibration and secondly makes a pulse operated two-axis linear motor transfer a work piece with low accuracy, as previously mentioned. FIGS. 10-A, 10-B and 10-C will be used to more clearly explain the creation of the undesirable vibration and the difficulty in manufacturing a piece of work with high accuracy. FIG. 10-A is a shematic view of the first member 1' and the second member 2' of the prior art which were used to obtain the performances shown in FIGS. 10-B and 10-C. FIG. 10-B is a graph showing the vertical deviation $\Delta d$ measured on the area defined by $X_A$ and $X_A'$ ($X_A'$ is not shown but is located adjacent to $X_A$ and behind the drawing) with respect to the normal gap distance D during the operation, which will prove the creation of the undesirable vibration. This operation was effected in accordance with the above mentioned energizing sequence. In FIG. 10-B the abscissa indicates the energizing sequence, wherein ①' through ⑪' correspond to $\{(X_A', X_a'), (X_B', X_b'), (X_C', X_c')\}$, $\{(X_B', X_b'), (X_C', X_c')\}$, $\{(X_B', X_b'), (X_C', X_c'), (X_D', X_d')\}$, $\{(X_C', X_c'), (X_D', X_d')\}$, $\{(X_C', X_c'), (X_D', X_d'), (X_E', X_e')\}$, $\{(X_D', X_d'), (X_E', X_e')\}$, $\{(X_D', X_d'), (X_E', X_e'), (X_A'EX_a')\}$, $\{(X_{e'}', X_e'), (X_A', X_a'')\}$, $\{(X_E', X_e')(X_A', X_a'), (X_B', X_b')\}$, $\{(X_A', X_a'), (X_B', X_b')\}$ and $\{(X_A', X_a'), (X_B', X_b'), (X_C', X_c')\}$, respectively, and the ordinate indicates the vertical deviation in $\mu$. FIG. 10-C is a graph showing the horizontal deviation $\Delta h$ along the moving direction R (shown in FIG. 10-A), with respect to the normal desired positioning S during said operation, which will prove the difficulty of manufacturing a work piece with high accuracy. This normal desired positioning will be accomplished when no vertical deviation of the member 2' with respect to the member 1' occurs. In FIG. 10-C, the abscissa is the same as shown in FIG. 10-B, and the ordinate indicates the horizontal deviation in $\mu$.

Figure 4:
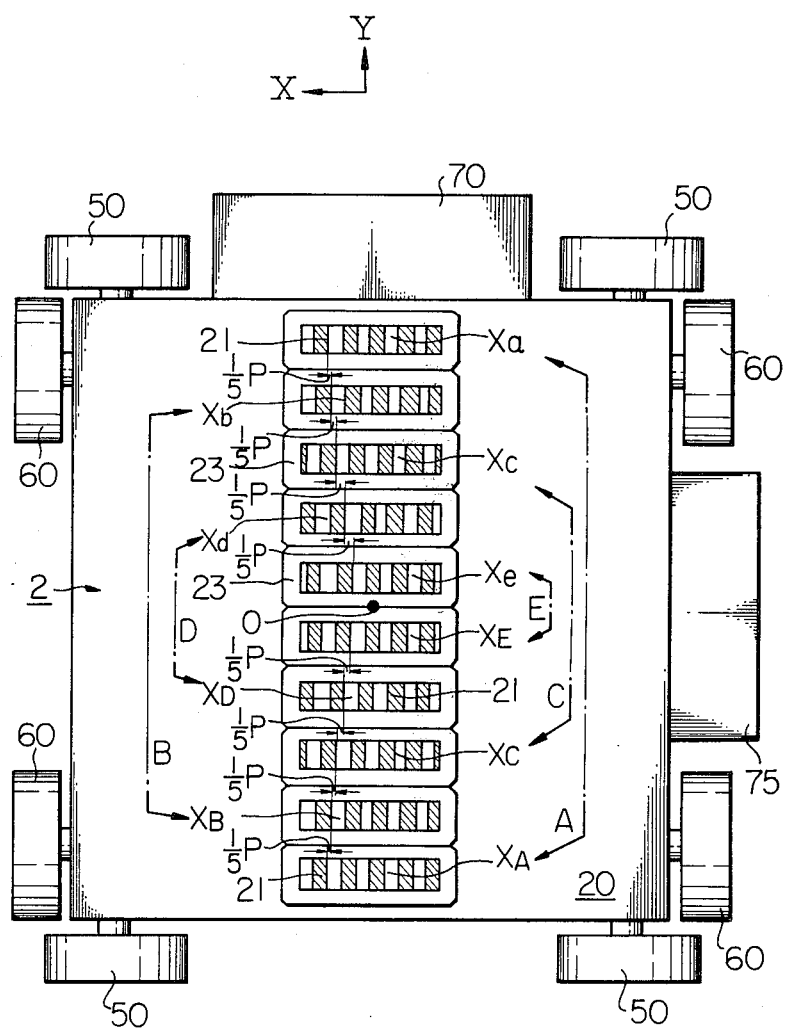
FIG. 4 shows the arrangement of the first electromagnetic energizing means according to the present invention.

FIG. 4 is an embodiment of the arrangement of the first electromagnetic energizing means according to the present invention, which does not set up any vibration during actual operation. FIG. 4 is a plan view showing the bottom of the present invention second member 2. In FIG. 4, the first electromagnetic energizing means is comprised of five pairs of first electromagnetic energizing element which are shown as $(X_A, X_a)$, $(X_B, X_b)$, $(X_C, X_c)$, $(X_D, X_d)$ and $(X_E, X_e)$, respectively. Each of the first electromagnetic energizing elements $X_A$, $X_B$, $X_C$, $X_D$ and $X_E$ acts as a north pole piece when the corresponding exciting coils 23 are energized. Each of the first electromagnetic energizing elements $X_a$, $X_b$, $X_c$, $X_d$ and $X_e$ acts as a south pole piece when the corresponding exciting coils 23 are energized. The first electromagnetic energizing element $X_A$ acting as north pole piece and the first electromagnetic energizing element $X_a$ acting as south pole piece form one electromagnet. This arrangement is the same with regard to the other first electromagnetic energizing means $(X_B, X_b)$, $(X_C, X_c)$, $(X_D, X_d)$ and $(X_E, X_e)$. The difference between the arrangement according to the prior art described above and the arrangement according to the present invention will be clear from the following discussion in which FIGS. 3 and 4 are compared.

In FIG. 3, the first electromagnetic energizing unit A', that is an electromagnet, is comprised of the first electromagnetic energizing elements $X_A'$ and $X_a'$, wherein the first electromagnetic energizing elements $X_A'$ and $X_a'$ are connected to each other. Similarly each of the first electromagnetic energizing elements $X_B'$ and $X_b'$, $X_C'$ and $X_c'$, and $X_D'$ and $X_d'$, and $X_E'$ and $X_e'$, which form the first electromagnetic energizing units B', C', D' and E', respectively, are connected to each other. It should be noted that, in FIG. 3 each of the first driving teeth 21' of the first electromagnetic energizing units A', B', C', D' and E' are arranged in the same phase with respect to the first teeth along the X-axis and are shifted by (1/5)P along the X-axis. P is the pitch, as previously mentioned, with which the first teeth 11' and also the first driving teeth 21 are arranged in the first direction (X). The arrangement of the first electromagnetic energizing element $(X_A, X_a)$, $(X_B, X_b)$–$(X_E, X_e)$ according to the present invention, as shown in FIG. 4, differs from the above-mentioned prior art arrangement shown in FIG. 3 in the following way. In FIG. 4 the first electromagnetic energizing elements $X_A$ and $X_a$, which comprise the first electromagnetic energizing unit A, are not connected to each other but are separated symmetrically with respect to the central point O of the second surface 20. Similarly each of the first electromagnetic energizing elements $X_B$ and $X_b$, $X_C$ and $X_c$, $X_D$ and $X_d$, and $X_E$ and $X_e$, which form the first electromagnetic energizing units, that is electromagnets, B, C, D and E, respectively, are separated and are arranged symmetrically with respect to the central point O. It should be noted that in FIG. 4 each of the first driving teeth 21 of the first electromagnetic energizing elements $X_A$, $X_B$, $X_C$, $X_D$ and $X_E$ are shifted by (1/5)P in relation to the driving teeth 21 of the adjacent elements and, also, each of the first driving teeth 21 of the first electromagnetic energizing elements $X_a$, $X_b$, $X_c$, $X_d$ and $X_e$ are shifted by (1/5)P in relation to the driving teeth 21 of the adjacent elements. Furthermore, the first driving teeth 21 of the first electromagnetic energizing elements $X_A$ and $X_a$ are arranged in the same phase with respect to the first teeth and arranged with a constant pitch P in the first direction (X). Similarly the first driving teeth 21 of the first electromagnetic energizing elements $X_B$ and $X_b$, $X_C$ and $X_c$, $X_D$ and $X_d$, and $X_E$ and $X_e$ are arranged in the same phase, respectively, with respect to the first teeth and arranged with a constant pitch P in the first direction (X), respectively.

Figure 5:
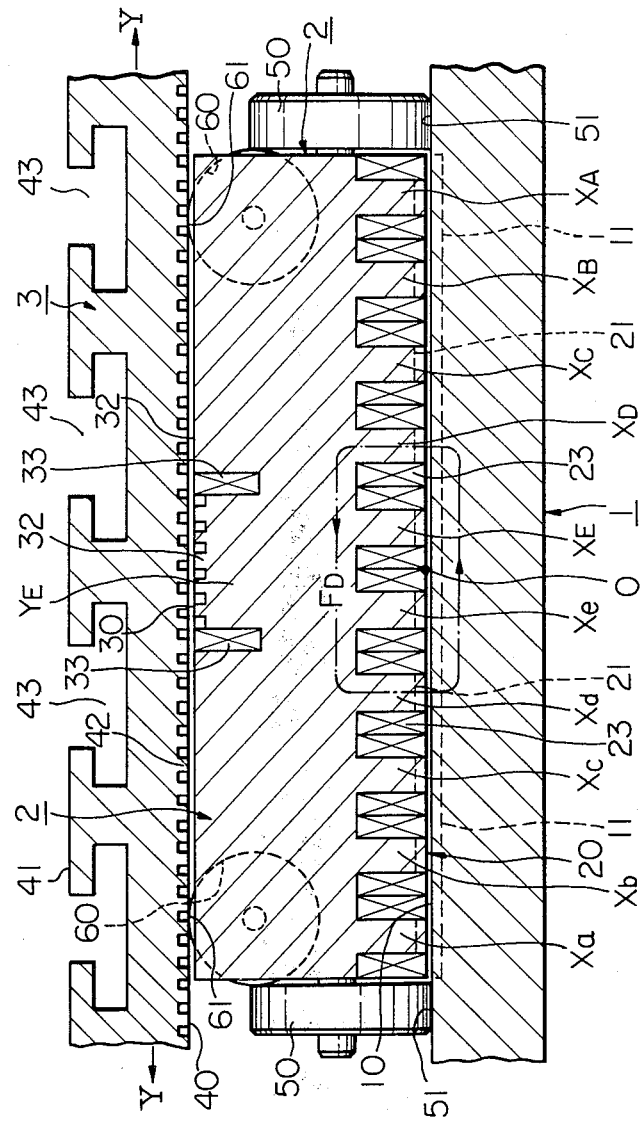
FIG. 5 is a sectional view of a pulse operated two-axis linear motor according to the present invention taken along line 5—5 in FIG. 1.

The reason the arrangement of the first electromagnetic energizing elements according to the present invention, as shown in FIG. 4, can overcome the aforementioned defect will be clarified by referring to FIG. 5 which is a sectional view of an embodiment according to the present invention taken along line 5—5 of FIG. 1. In FIG. 5 when, for example, the exciting coils 23 of the first electromagnetic energizing elements $X_D$ and $X_d$ which form the first electromagnetic energizing unit D in FIG. 4, are energized, a magnetic flux path is obtained, as indicated by the chain and dot line $F_D$ in FIG. 5. Attractive forces then occur between the first driving teeth 21 of the first electromagnetic energizing element $X_D$ and the corresponding first teeth 11, and between the first driving teeth 21 of the first electromagnetic energizing element $X_d$ and the corresponding first teeth 11. Consequently, the addition of said attractive forces is equivalently transformed to the attractive force which occurs between the central point O and the first member 1. Similarly, when the exciting coils 23 of the first electromagnetic energizing elements $X_A$ and $X_a$, $X_B$ and $X_b$, $X_C$ and $X_c$, and $X_E$ and $X_e$ of the first electromagnetic energizing units A, B, C and E are energized, respectively, magnetic flux pathes are obtained in the same way as indicated by chain and dot line $F_D$ in FIG. 5. Attractive forces then occur between the first driving teeth 21 of the first electromagnetic energizing elements $X_a$, $X_b$, $X_c$ and $X_e$, and the corresponding first teeth 11, respectively. Consequently, each addition of said attractive forces is equivalently transformed to the attractive force which occurs between the central point 0 and the first member 1.

As can be understood from the above description, there is no movement of the position on the second surface 20 to which the strong attractive force is applied because the equivalent strong attractive force is applied at any time only to the central point 0. As a result, the performances of the prior art shown in FIGS. 10-B and 10-C are improved by the present invention. The improvement will be clarified by referring to FIGS. 11-B and 11-C when compared to FIGS. 10-B and 10-C, respectively. FIG. 11-A is a schematic view of the first member 1 and the second member 2 of the present invention, the performances of which are shown in FIGS. 11-B and 11-C. In FIGS. 11-B and 11-C, the abscissae indicate, respectively, the same energizing sequence, wherein ① through ⑪ correspond to $\{(X_A, X_a), (X_B, X_b), (X_C, X_c)\}$, $\{(X_B, X_b), (X_C, X_c)\}$, $\{(X_B, X_b), (X_C, X_c), (X_D, X_d)\}$, $\{(X_C, X_c), (X_D, X_d)\}$, $\{(X_C, X_c), (X_D, X_d), (X_E, X_e)\}$, $\{(X_D, X_d), (X_E, X_e)\}$, $\{(X_D, X_d), (X_E, X_e), (X_A, X_a)\}$, $\{(X_E, X_e), (X_A, X_a)\}$, $\{(X_E, X_e), (X_A, X_a), (X_B, X_b)\}$, $\{(X_A, X_a), (X_B, X_b)\}$ and $\{(X_A, X_a), (X_B, X_b), (X_C, X_c)\}$, respectively, and the ordinates of FIG. 11-B and FIG. 11-C are the same as those of FIG. 10-B and FIG. 10-C, respectively.

Figure 6:
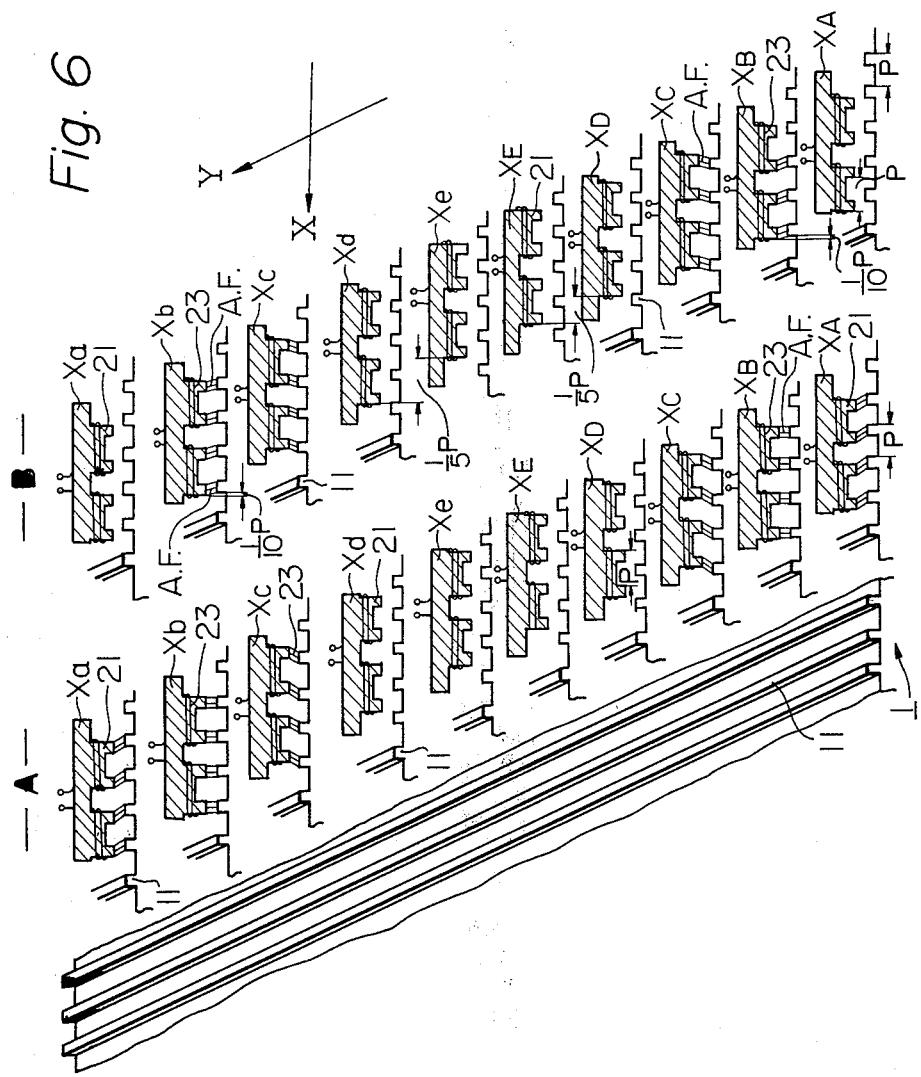
FIG. 6 is a schematic perspective view of first teeth 11, first driving teeth 21 and first electromagnetic elements $X_A - X_E$ and $X_a - X_e$.

The moving action of the pulse operated surface motor according to the present invention will now be explained by referring to FIG. 6. FIG. 6 is a schematic perspective view showing the first teeth 11, the first driving teeth 21 and the first electromagnetic energizing elements $X_A$, $X_B-X_E$ and $X_a$, $X_b-X_e$.

In addition FIG. 6 shows two energizing states A and B, where the pulse operated linear motor is driven with 2 phase - 3 phase alternate excitation. In the 2 phase - 3 phase alternate excitation, the first electromagnetic energizing elements $(X_A, X_a)$, $(X_B, X_b)$–$(X_E, X_e)$ are energized in this cyclical order: $\{(X_A, X_a), (X_B, X_b)\} \rightarrow \{(X_A, X_a), (X_B, X_b), (X_C, X_c)\} \rightarrow \{(X_B, X_b), (X_C, X_c)\} \rightarrow \{(X_B, X_b), (X_C, X_c), (X_D, X_d)\} \rightarrow \{(X_C, X_c), (X_D, X_d)\} \rightarrow \{(X_C, X_c), (X_D, X_d), (X_E, X_e)\} \rightarrow \{(X_D, X_d), (X_E, X_e)\} \rightarrow \{(X_D, X_d), (X_E, X_e), (X_A, X_a)\} \rightarrow \{(X_E, X_e), (X_A, X_a)\} \rightarrow \{(X_E, X_e), (X_A, X_a), (X_B, X_b)\}$, whereby the second member 2 steps with the pitch 1/10 P with respect to the first member 1 in the first direction.

FIG. 6-A shows one energizing state, in which $\{(X_A, X_a), (X_B, X_b), (X_C, X_c)\}$ are energized and FIG. 6-B shows another energizing state which occurs next to said energizing state in FIG. 6-A, in which $\{(X_B, X_b), (X_C, X_c)\}$ are energized. When the exciting coils 23 of the first electromagnetic energizing elements $(X_A, X_a)$, $(X_B, X_b)$ and $(X_C, X_c)$ are energized, the first electromagnetic elements, and accordingly the second member 2, are attracted to the position where the center portions of the first driving teeth 21 of the first electromagnetic energizing elements $X_B$ and $X_b$ coincide with the center portions of the adjacent first teeth 11. The attractive force is depicted by parallel lines A.F. in FIGS. 6-A and B. Next, after the above-mentioned energing order the exciting coils 23 of the first electromagnetic energizing elements $(X_B, X_b)$ and $(X_C, X_c)$ are energized, whereby the second member 2 steps by 1/10 P to the positions where the middle point between each center portion of the first electromagnetic energizing elements $(X_B, X_b)$ and $(X_C, X_c)$ coincide with the center portion of the adjacent first teeth 11. This is because the first driving teeth 11 of the first electromagnetic energizing elements $X_A$ and $X_a$ are shifted by 1/5 P along the first direction with respect to the first driving teeth 11 of elements $X_B$ and $X_b$ and, further, the first driving teeth 11 of the elements $X_B$ and $X_b$ are shifted by 1/5 P with respect to the first driving teeth 11 of the elements $X_C$ and $X_c$, and so on. The above-mentioned energizing order is not limited to the 2 phase – 3 phase alternate excitation sequence and orders such as $\{(X_A, X_a)\} \rightarrow \{(X_A, X_a), (X_B, X_b)\} \rightarrow \{(X_B, X_b)\} \rightarrow \{(X_B, X_b), (X_C, X_c)\} \rightarrow \{(X_C, X_c)\} \rightarrow \{(X_C, X_c), (X_D, X_d)\} \rightarrow \{(X_D, X_d)\} \rightarrow \{(X_D, X_d), (X_E, X_e)\} \rightarrow \{(X_E, X_e)\} \rightarrow \{(X_E, X_e), (X_A, X_a)\}$ may also be used.

Figure 7:
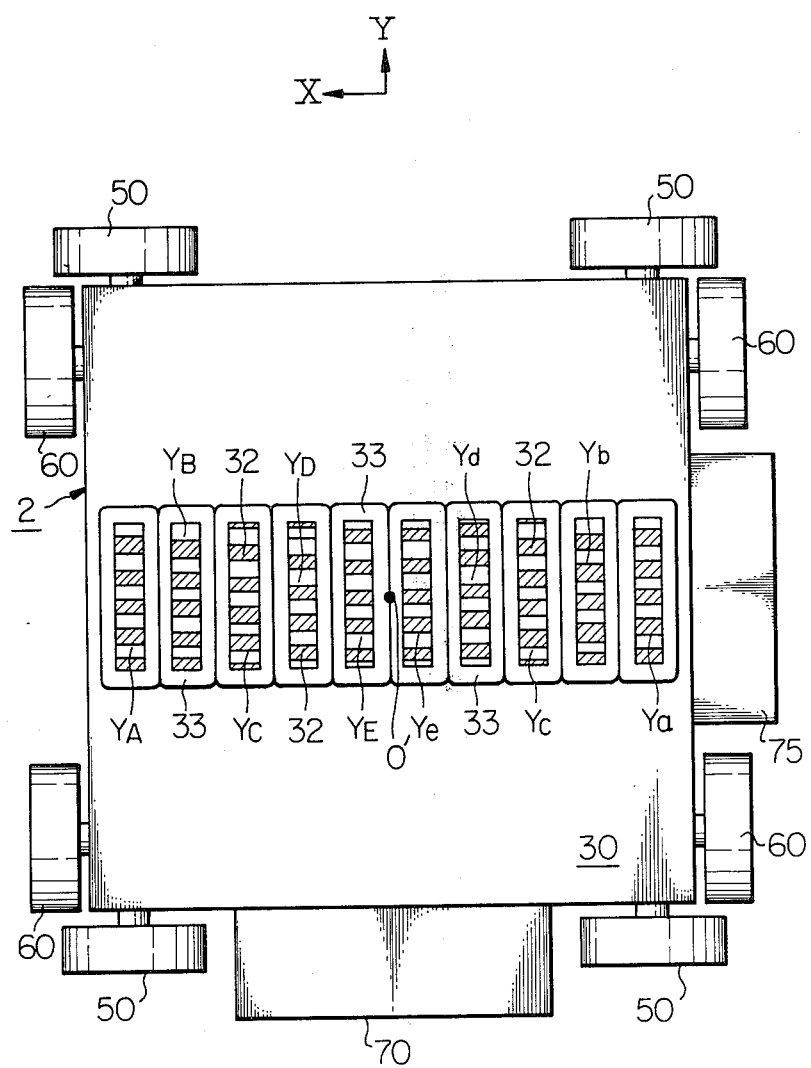
FIG. 7 shows the arrangement of a second electromagnetic energizing means according to the present invention.

The above-mentioned explanation relates only to the arrangement of the first electromagnetic energizing means, however, the arrangement of the second electromagnetic energizing means according to the present invention is exactly the same as that of the first electromagnetic energizing means. It should also be noted that the arrangement of the second electromagnetic energizing means, according to the present invention, as shown in FIG. 7, can overcome the defect of the movement of the attractive force which occurs in the above-mentioned prior art between the second member 2 and the third member 3. FIG. 7 is a plan view of the top of the second member 2, wherein each of the second electromagnetic energizing elements $Y_A$ and $Y_a$, $Y_B$ and $Y_b$, $Y_C$ and $Y_c$, $Y_D$ and $Y_d$, and $Y_E$ and $Y_e$ are separated and are arranged symmetrically with respect to the central point O' of the third surface 30.

Figure 8:
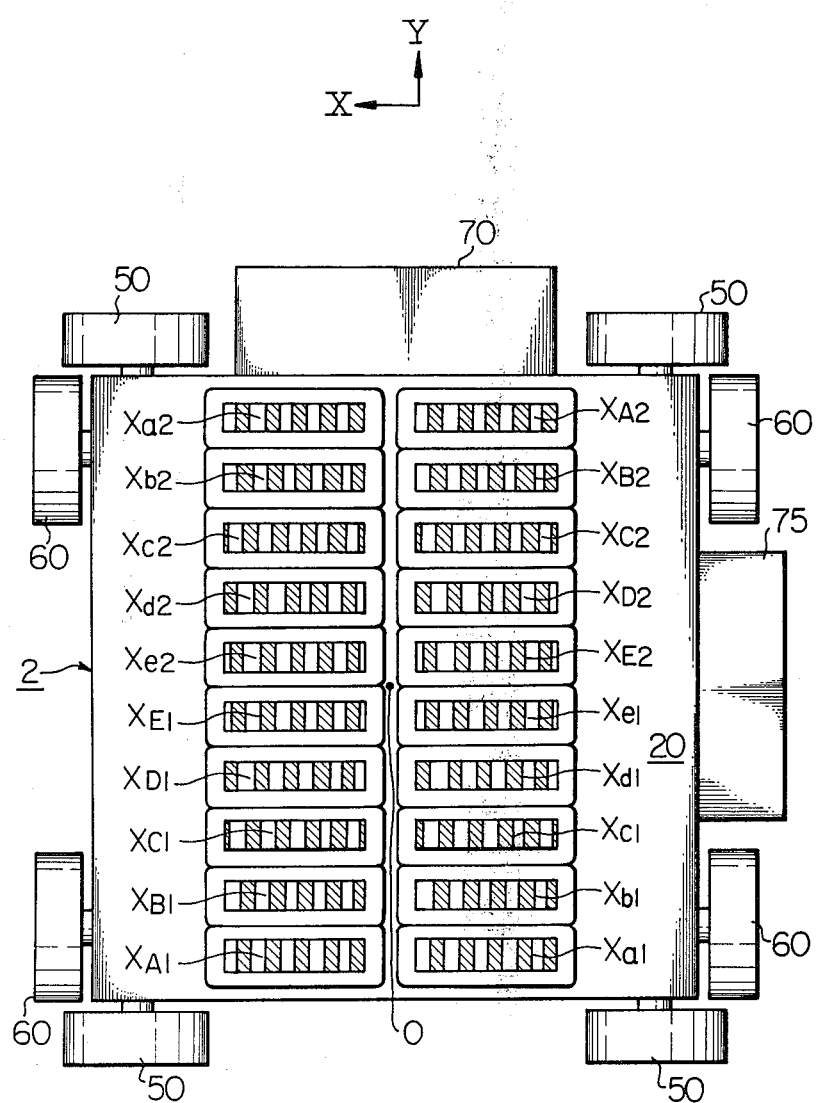
FIG. 8 shows the arrangement of a modified embodiment according to the present invention.

FIG. 8 is a plan view showing a modified arrangement of the first and/or second electromagnetic energizing elements according to the present invention, however, the modified arrangement in this figure is indicated only with regard to the first electromagnetic energizing elements. In FIG. 8, the first electromagnetic energizing elements $X_{A1}$ and $X_{a1}$ form one electromagnet A1. Similarly, the first electromagnetic energizing elements $X_{B1}$ and $X_{b1}$, $X_{C1}$ and $X_{c1}$, $X_{D1}$ and $X_{d1}$, and $X_{E1}$ and $X_{e1}$ form the electromagnets B1, C1, D1 and E1, respectively. Further, the first electromagnetic energizing elements $X_{A2}$ and $X_{a2}$, $X_{B2}$ and $X_{b2}$, $X_{C2}$ and $X_{c2}$, $X_{D2}$ and $X_{d2}$, and $X_{E2}$ and $X_{e2}$ form the electromagnets A2, B2, D2 and E2, respectively. In operation, each pair of electromagnets (A1, A2), (B1, B2), (C1, C2), (D1, D2) and (E1, E2) are energized simultaneously. When, for example, the pair of electromagnets (D1, D2) are energized the equivalent attractive force is obtained at the central point 0. The arrangement shown in FIG. 8 can also overcome the aforementioned defects. It should be noted that each of the first driving teeth 21 of the electromagnets (A1, A2), (B1, B2), (C1, C2), (D1, D2) and (E1, E2) are arranged in same phase with respect to the first teeth along the X-axis.

FIG. 9 is a perspective view of the pulse operated two-axis linear motor according to the present invention, which shows the pulse operated two-axis linear motor as it could be utilized in a numerical controlled manufactuaring system. All the elements indicated in FIG. 9 correspond to the elements referenced by the same numerals or symbols in FIG. 1. Usually a work piece to be processed, which is set on the top surface 41 of the third member 3 is heavy. In operation, the weight of the heavy work piece which is located on the third member 3, the weight of the second and third member and the attractive force which occurs between the first surface 10 and the second surface 20, exert a large downward force on the rollers 50 which are shown in FIG. 1. In addition, the weight of the heavy work piece, the weight of the third member and the attractive force which occurs between the third surface 30 and the fourth surface 40, exert a large downward force on the rollers 60 which are shown in FIG. 1. Accordingly said large downward force should not be concentrated but should be dispersed by a group of flat rollers. The groups of flat rollers are shown in FIG. 9 by reference numerals 81, 82, 83 and 84 (the latter of which is indicated but not shown), in which the group of flat rollers referenced by 81 and 83 form V-shaped guide rails and the group of flat rollers referenced by 82 and 84 form U-shaped guide trenches. Each of the V-shaped guide rails and the U-shaped guide trenches is comprised of a plurality of needle bearings 85. V-shaped trenches 86 and 87 are slidably connected to the V-shaped guide rails 81 and 83, respectively. U-shaped projections 88 and 89, the latter of which is indicated but not shown, are also slidably connected to the U-shaped guide trenches 82 and 84, respectively.

In operation, a great deal of metal dust and metal particles from work by a machine tool are accumulated on the third member 3 and the first member 1. Especially, a great deal of the metal dust and metal particles are most of time accumulated on the first surface 10, which causes trouble in the normal operation of the pulse operated surface motor. In FIG. 9 the reference numeral 90 indicates a cover which prevents the accumulation of the metal dust and metal particles on the first surface 10. The cover 90 is comprised of bellows and accordingly does not prevent the movement of the second member 2 in the first direction. The reference numeral 91 also indicates a cover. The cover 91 prevents said accumulation on the third surface 30 of the second member 2.

As mentioned above, the present invention can overcome the defects of the creation of undesirable vibration in the pulse operated two-axis linear motor and the difficulty in manufacturing a work piece with high accuracy. In addition, the present invention has following advantages.

1. The efficiency of converting an input electric power to a power for transferring the second member 2 in the first direction and the efficiency of converting an input electric power to a power for transferring the third member 3 in the second direction, are increased compared to the prior art, for example U.S. Pat. No. Re. 27,436 (original U.S. Pat. No. 3,376,578, dated Apr. 2, 1968, Ser. No. 554,181, May 31, 1966. Application for reissue March 27, 1970, Ser. No. 24,060). This is because, a plurality of first teeth 11 and a cooperating plurality of first electromagnetical energizing means are located on one horizontal plane, which drives an object set on the third member in the first direction. A plurality of second teeth 42 and a cooperating plurality of second electromagnetical energizing means are located on another horizontal plane, which drives the object in the second direction.

2. The structure of the pulse operated motor according to the present invention is simple and can be manufactured easily. This is because, mechanical driving units using for example the rollers 50 and 60, and electromagnetical energizing means using for example the exciting coils 23 and 33 and the first and second driving teeth 21 and 32, which require highly skilled labor and accurate manufacturing, are concentrated on only the second member 2. On the other hand, other members, that is the first member 1 and third member 3, are easily manufactured, since these members are provided only with simple first teeth 11 and simple second teeth 42.

3. Both a stroke in which the second member 2 moves in the first direction with respect to the first member 1 and a stroke in which the third member 3 moves in the second direction with respect to the second member 2, are relatively long. This is because, the first electromagnetic energizing means is arranged so that the length of the rectangular shaped first electromagnetic energizing means (see FIG. 4) is parallel to the second direction (Y), and the second electromagnetic energizing means is arranged so that the length of the rectangular shaped second electromagnetic energizing means (see FIG. 7) is parallel to the first direction (X).

What is claimed is:

1. A pulse operated two-axis linear motor comprised of pulse operated linear motors including: a first member having a first surface;

a second member of which the bottom forms a second surface and the top forms a third surface, which can move in a first direction with respect to the first member keeping a small air gap between said first surface and said second surface;

a third member having a fourth surface, which can move in a second direction which crosses the first direction with respect to the second member keeping a small air gap between said third surface and said fourth surface;

wherein the first surface is comprised of a plurality of first teeth made of magnetic material which are arranged in the first direction with a constant pitch "P", and each first tooth extends in the second direction; the second surface is comprised of N number (N is a predetermined positive integer) of first electromagnetic energizing units which drive the second member in the first direction with respect to the first member by electromagnetically cooperating with said first teeth wherein each first electromagnetic energizing unit has one pair of first electromagnetic elements comprised of first driving teeth which are surrounded by exciting coils and are arranged in the first direction with the constant pitch "P" and each of the first driving teeth extends in the second direction and further, each of the first driving teeth of one of the first electromagnetic energizing units is shifted by (1/N)P in relation to each of the first driving teeth of the adjacent members of the first electromagnetic units; the fourth surface is comprised of a plurality of second teeth made of magnetic material which are arranged in the second direction with a constant pitch "P", and each second tooth extends in the first direction;

the third surface is comprised of N' number (N' is a predetermined positive integer) of second electromagnetic energizing units which drive the third member in the second direction with respect to the second member by electromagnetically cooperating with said second teeth wherein each first electromagnetic energizing unit has one pair of second electromagnetic elements comprised of second driving teeth which are surrounded by exciting coils and are arranged in the second direction with the constant pitch "P" and each of the second driving teeth extends in the first direction and, further, each of the second driving teeth of one of the second electromagnetic energizing units is shifted by (1/N')P' in relation to each of the second driving teeth of the adjacent members of the second electromagnetic units;

wherein one first electromagnetic energizing element of each of the first electromagnetic energizing units is arranged symmetrically, via a predetermined central point on the second surface, with respect to another first electromagnetic energizing element of said first electromagnetic energizing unit and one second electromagnetic energizing element of each of the second electromagnetic energizing units is arranged symmetrically, via a predetermined central point on the third surface, with respect to another second electromagnetic energizing element of said second electromagnetic energizing unit.

2. A pulse operated two-axis linear motor comprised of pulse operated linear motors as set forth in claim 1, in which said second surface is comprised of a plurality of pairs of said first electromagnetic energizing units, and said third surface is comprised of a plurality of pairs of asid second electromagnetic energizing units, wherein one pair of first electromagnetic energizing units of each of a plurality of pairs of the first electromagnetic energizing units is arranged symmetrically, via a predetermined central point on the second surface, with respect to another pair of first electromagnetic energizing units of said pairs of the first electromagnetic energizing units, and one pair of second electromagnetic energizing units of each of a plurality of pairs of the second electromagnetic energizing units is arranged symmetrically, via a predetermined central point on the third surface, with respect to another pair of second electromagnetic energizing units of said pairs of the second electromagnetic energizing units.

3. A pulse operated two-axis linear motor comprised of pulse operated linear motors as set forth in claim 1, in which at least one of said small air gap between said first surface and said second surface and said small air gap between said third surface and said fourth surface, is realized by a V-shaped guide rail comprised of a plurality of needle bearings and a V-shaped trench which is slidably connected to the V-shaped guide rail and by a U-shaped guide trench comprised of a plurality of needle bearings and a U-shaped projection which is slidably connected to the U-shaped guide trench.

4. A pulse operated two-axis linear motor comprised of pulse operated linear motors as set forth in claim 1, in which said first surface is covered by bellows.

* * * * *